United States Patent
Mishra

(10) Patent No.: US 9,576,112 B1
(45) Date of Patent: Feb. 21, 2017

(54) EMBEDDED REVERSIBLY OPAQUE DISPLAY COVER FOR AN ELECTRONIC DEVICE

(71) Applicant: Amazon Technologies, Inc., Seattle, WA (US)

(72) Inventor: Pushpendra Narain Mishra, Hardoi (IN)

(73) Assignee: Amazon Technologies, Inc., Seattle, WA (US)

(*) Notice: Subject to any disclaimer, the term of this patent is extended or adjusted under 35 U.S.C. 154(b) by 74 days.

(21) Appl. No.: 14/626,875

(22) Filed: Feb. 19, 2015

(51) Int. Cl.
*G06F 21/00* (2013.01)
*G06F 21/60* (2013.01)
*G06F 3/047* (2006.01)

(52) U.S. Cl.
CPC .............. *G06F 21/00* (2013.01); *G06F 3/047* (2013.01); *G06F 21/60* (2013.01); *G09G 2300/04* (2013.01)

(58) Field of Classification Search
CPC .......... G06F 3/041–3/047; G06F 21/60; G06F 21/00; G09G 2300/04
See application file for complete search history.

(56) References Cited

U.S. PATENT DOCUMENTS

| | | | | |
|---|---|---|---|---|
| 6,246,397 B1* | 6/2001 | Vossler | ................. | G09G 1/167 345/204 |
| 2015/0371613 A1* | 12/2015 | Patel | ...................... | G06F 21/10 345/549 |

FOREIGN PATENT DOCUMENTS

| | | | | | |
|---|---|---|---|---|---|
| CN | 101676512 A | * | 3/2010 | | |
| JP | 62212247 A | * | 9/1987 | ............. | C03C 27/00 |

* cited by examiner

*Primary Examiner* — Larry Sternbane
(74) *Attorney, Agent, or Firm* — Sutherland Asbill & Brennan LLP

(57) ABSTRACT

Embodiments of the disclosure relate to a cover for an electronic device. The cover can be deployed on a transparent surface of the electronic device and can reversibly occlude the view through the transparent surface. In certain embodiments, the cover can include a closed bounding surface region that is transparent and has a specific volume. The bounding surface can define an interior open space that can be partitioned into multiple cavities, where nearest-neighboring cavities can share a surface that defines each of such cavities. In one embodiment, in order to occlude the view through the transparent surface, an opaque liquid can be injected into the cavities, where the liquid can solidify and, thus, can form an opaque solid layer. To reverse such an occlusion and, effectively, uncover the transparent surface, the solid layer can be melted by applying a suitable voltage to at least one of the multiple cavities.

20 Claims, 7 Drawing Sheets

EMBEDDED REVERSIBLY OPAQUE DISPLAY COVER FOR AN ELECTRONIC DEVICE

BACKGROUND

A cover that can be attached, usually in a wrap-around fashion, to a portable electronic device, such as a tablet or a smartphone, may increase the longevity of such a device by mitigating or avoiding damage throughout the course of usage of the device. Typical covers can be bulky and while they can be removed, end-users tend to keep their devices covered at all times.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

The disclosure recognizes and addresses, in at least certain embodiments, the utilization of protective covers in portable electronic devices. Accordingly, embodiments of the disclosure provide a cover for an electronic device. The cover can be deployed on a transparent surface of the electronic device, such as a display surface, and can reversibly occlude the view through the surface. In certain embodiments, the cover can include a closed bounding surface that is transparent and has a specific volume and uniform thickness. The uniform thickness refers to a thickness that is essentially independent of the position at which the thickness is determined or otherwise probed. In one embodiment, the volume of the bounding surface can be partitioned into multiple semi-open spaces (which also may be referred to as cavities) where nearest-neighboring spaces can share a surface that defines, at least in part, each of such spaces. In one embodiment, in order to occlude the view through the surface, an opaque liquid can be injected into the open spaces, where the liquid can solidify and, thus, can form an opaque solid layer. The liquid can be contained in one or more reservoirs fluidically coupled to the bounding surface. In the alternative, a solid phase of a substance that forms the liquid upon melting can be retained in the one or more reservoirs. To reverse such an occlusion and, effectively, uncover the transparent surface of the electronic device, the opaque solid layer can be melted. To that end, in one example, a suitable voltage can be applied to at least one of the multiple open spaces. In one embodiment, the voltage can arise from amplifying an initial voltage generated in response to heat transfer from a source external to the electronic device.

Figure 1:
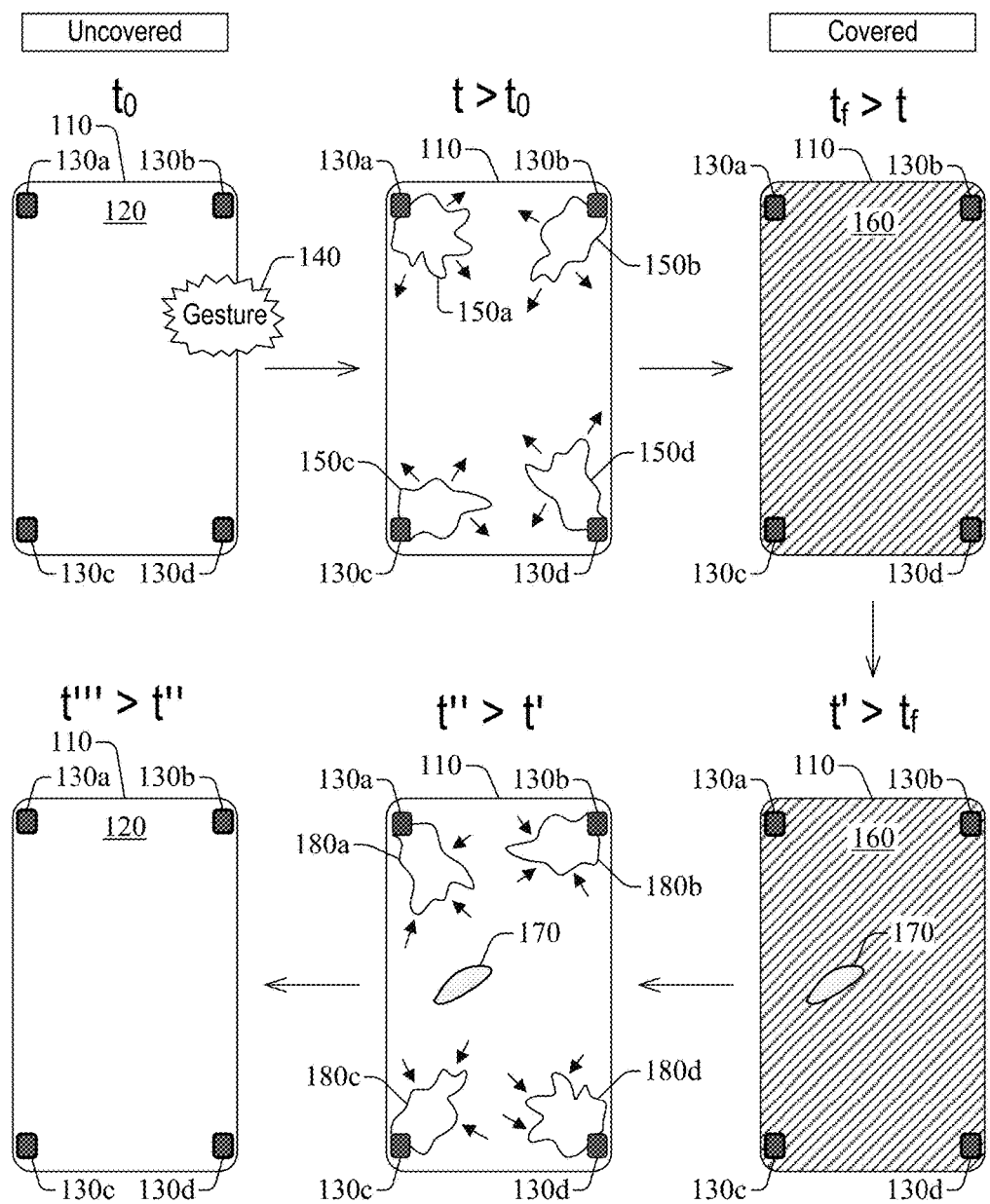
FIG. 1 illustrates an example of an embedded reversible cover for an electronic device in accordance with one or more embodiments of the disclosure.

FIG. 1 illustrates an example of a reversible cover for an electronic device 110 in accordance with one or more embodiments of the disclosure. The electronic device 110 can be embodied in a general purpose or a special purpose computing device that may be autonomously powered, at least for a certain period, via a battery and/or a similar energy storage device. In one example, the electronic device 110 can be embodied in a portable personal computer or a handheld computing device, such as a mobile tablet computer, an electronic-book reader (also referred to as an e-reader), a mobile telephone (e.g., a smartphone), and the like. In another example, the electronic device 110 can be embodied in a wearable computing device, such as watch, a pedometer, a biosensing wristband, goggles or head-mounted visors, or the like. In yet another example, the electronic device 110 can be embodied in portable consumer electronics equipment, such as a camera, a portable television set, a gaming console, a navigation device, a voice-over-internet-protocol telephone, a media playback device, or the like. A top-view of the electronic device 110 is presented in FIG. 1, showing a surface 120 of the electronic device. The surface 120 can permit viewing content or other types of indicia displayed or otherwise presented by the electronic device 110. In addition or in other embodiments, the surface 120 can permit other forms of interaction with an end-user, such as touch (e.g., swipes, taps, actuation of a button, or the like) or other types of contact. In one embodiment, the surface 120 can be formed from a transparent or translucent solid material (e.g., a plastic, a glass, or the like), and can include multiple layers. Translucency in accordance with aspects of this disclosure may be defined in terms of transparency of the solid material in the visible portion of the spectrum of electromagnetic radiation—e.g., wavelengths in the range from about 400 nm to about 800 nm. More particularly, in one example, translucency may be defined as optical transmittance in the range from about 10% transmittance to about 90% transmittance.

Figure 2:
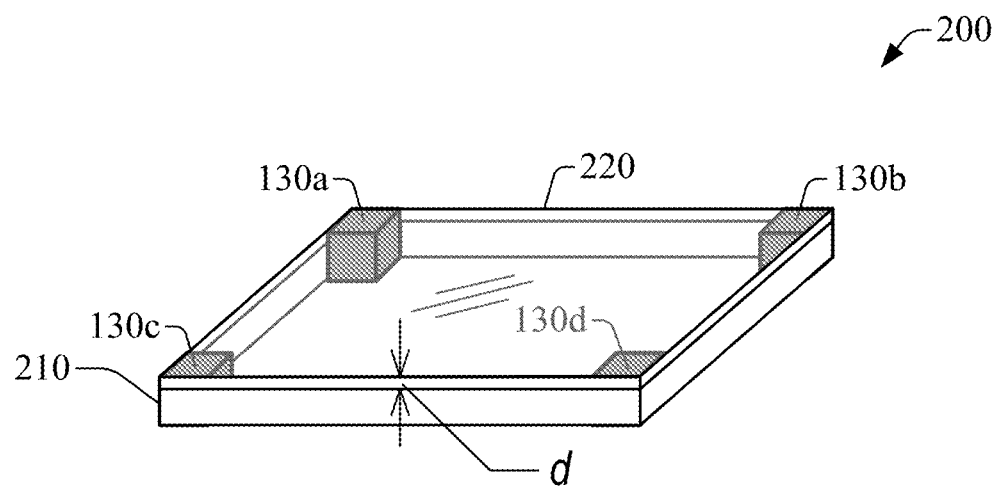
FIG. 2 illustrates an example of a portion of an electronic device in accordance with one or more embodiments of the disclosure.

As illustrated, at an instant $t_0$, the electronic device 110 can be exposed to a gesture 140 or another type of interaction (such as a tap, a swipe, actuation of a physical button, or the like), where the gesture or the interaction originate from an end-user. In one example, the electronic device 110 can include input device (e.g., a touch-screen display, a button, a camera, a microphone, a reader device or scanner, inductive coils, or the like) configured to receive an input signal indicative or otherwise representative of the gesture 140 or the other interaction. It should be appreciated that, in one aspect, the gesture 140 or the other interaction can be directed to convey an intent or desire to cover the surface 120, e.g., the gesture 140 can be a voice command (such as a keyword or phrase) a snap of fingers, a certain movement, or the like, and the interaction can be a specific sequence of taps, a certain movement of the electronic device 110, or the like. As such, in response to the gesture 140 or the other type of interaction, at a subsequent instant t, for example, a certain amount of liquid can enter into a transparent region (not shown) included in the surface 120. In one embodiment, the transparent region can be bound by six surfaces and can define an interior space that can receive the liquid. As such, the six surfaces bounding the region may be referred to as a bounding surface, and the transparent region may be referred to as a transparent bounding region or hollow transparent region. The liquid can be injected into the transparent region from a group of reservoirs, at least one reservoir of the group of reservoirs being fluidically coupled to the transparent region. (Injection of the liquid is represented by arrows in FIG. 1.) In certain embodiments, each of the reservoirs is configured to receive an amount of a substance (e.g. a Pb—Mg alloy) in liquid phase and can define a passage or another type of opening that can permit egress of liquid to the transparent region. In order to inject the liquid, in one example, a certain amount of a substance in solid state can be contained in each of the group of reservoirs. In addition, the substance can be melted and, therefore, the volume of the formed liquid can exceed the volume of the reservoir that contains the liquid. In certain embodiments, a heating device coupled (e.g., electrically and thermally coupled) to the reservoir can increase the temperature of the substance and cause it to melt. In view of the fluidic coupling between the reservoir and the transparent region, the liquid can overflow into the transparent region, producing a flow of liquid. As illustrated, four reservoirs 130a-130d can provide, respectively, four flows 150a-150d of liquid. In certain embodiments, the transparent region can be embodied in a solid (flexible or otherwise) bounding surface that can be placed on top of a transparent or translucent surface included in the surface 120. Such a transparent or translucent surface can be embodied in a screen or another type of surface that can permit viewing content or other type of indicia displayed or otherwise presented by the electronic device 110. The bounding surface can define a semi-open space that, in certain embodiments, can be partitioned into multiple semi-open cavities (not depicted in FIG. 1). Nearest-neighboring cavities of the multiple semi-open cavities defined by the solid bounding surface (e.g., the solid bounding surface 220 shown in FIG. 2) can share at least one surface that defines each of such cavities, and can be fluidically coupled in order to permit transfer of fluid from one semi-open cavity to another. In one implementation, the multiple semi-open cavities can be embodied in or can constitute a three-dimensional (3D) Voronoi tessellation, where each of the semi-open cavities can be associated with a single specific point in space, where such a point may be referred to as a node. It can be appreciated that the 3D Voronoi tessellation can provide a simply connected network of semi-open spaces with full coverage of the volume defined by the solid bounding surface. As an illustration, FIG. 2 illustrates a schematic representation of an example embodiment 200 of the electronic device 110 in which the reservoirs 130a-130d are shown relative to a housing 210 of the electronic device 110. A solid bounding surface 220 in accordance with the disclosure also is shown. In one aspect, the solid (flexible or otherwise) bounding surface 220 can have a specific volume and a substantially uniform or uniform thickness d (a real number) in the range from about 200 µm to about 2 mm. The thickness d can be determined by numerous factors, individually or in combination, such as the viscosity of the liquid that flows within the solid bounding surface and the multiple cavities therein; the thermal dilation coefficient of the substance that forms the liquid; or other physical, chemical, or physicochemical parameters of the substance that forms the liquid. Similarly, the volume can be determined by numerous factors, such as the size of the display surface of the electronic device 110. It should be appreciated that the substance, in the solid phases, can be mechanically strong (e.g., high strength, high hardness, and/or high toughness), flexible, and/or chemically resistant, which can provide mechanical stability and/or handling resilience to the solid bounding surface 220 when the substance is in the solid phase and contained within such a surface. Mechanical strength refers to the capacity of a material to withstand a load and can include, for example, yield strength, compressive strength, tensile strength, fatigue strength, impact strength, or a combination thereof.

After a certain time interval, at a time $t_f$, for example, each of the multiple semi-open cavities included in the transparent region included in the surface 120 can be filled, at least partially, with the opaque liquid injected in response to the gesture 140. The liquid can solidify after injection into the multiple semi-open cavities, and an opaque cover 160 can be formed on the surface 120 of the electronic device 110, occluding the view through the surface 120.

Figure 3:
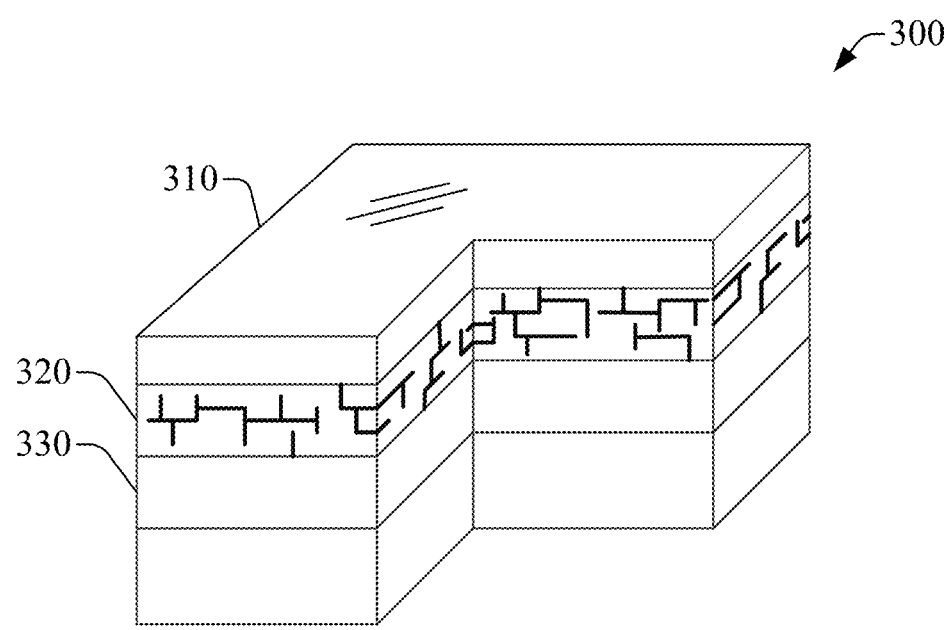
FIG. 3 presents an example of another portion of an electronic device in accordance with one or more embodiments of the disclosure.

As described herein, the surface 120 can be reversibly occluded. As such, the opaque cover 160 can be removed in order to restore the viewing through the surface 120. To that end, in one aspect, at a time $t'>t_f$, an end-user of the electronic device 110 can swipe or otherwise interact with the surface of the electronic device 110, which is occluded by the opaque cover 160. In response to a swipe 170, a heat sensor included in the electronic device 110 can sense or otherwise detect an amount of heat transferred from the swipe and received at the electronic device 110. In one embodiment, the heat sensor can be distributed, and can include a transparent or translucent layer placed on top of the bounding surface configured to receive liquid from one or more reservoirs in accordance with aspects described herein. The transparent or translucent layer can be formed from a material that can absorb electromagnetic radiation in the infrared (IR) portion of the electromagnetic spectrum. It such an embodiment, the heat sensor may be referred to as a heat sensor layer. Regardless of the specific structure, the heat sensor also can include circuitry that can receive or otherwise generate an electric current in response to absorbed IR electromagnetic radiation, and can output or otherwise generate a voltage indicative or otherwise representative of the electric current. In certain implementations, such a circuitry can be included in an electronics unit included in the electronic device 110. As an illustration, FIG. 3 presents a schematic representation of an example embodiment 300 of the electronic device 110 in which a portion of a distributed heat sensor 310 is shown. As illustrated, the heat sensor 310 can be placed on top of a bounding surface 320 defining multiple cavities as described herein. The multiple cavities are depicted which thick dashes. In addition, the bounding surface 320 is placed on top of a transparent or translucent layer 330, which can embody or can constitute the surface 120 as described herein. More specifically, the bounding surface 320 can include a first surface and a second surface opposing the first surface, and the heat sensor 310 can be placed on top of the first surface. Further, the second surface of the bounding surface 320 can be in contact with a surface of the transparent or translucent layer 330.

In other embodiments, instead of detecting heat, a capacitive sensor or another type of sensor (e.g., a capacitive sensor) can detect touch of the surface of the electronic device 110 (e.g., presence of a swipe at the surface) or another type of gesture indicative of an intent to retract or otherwise remove the opaque cover 160. Detection of touch or a gesture can cause the sensor to provide an electric signal representative of the intent to remove the opaque cover 160.

In addition or in other embodiments, the electronic device 110 can include other circuitry that can amplify the voltage output or other types of electrical signals generated by the heat sensor and/or the touch sensor. The magnitude or level of the amplification can be determined, for example, by an intended or otherwise desired voltage value suitable for melting the substance (or material) that fills the transparent region and forms the occluded cover 160. More specifically, yet not exclusively, a voltage generated by the heat sensor of the electronic device 110 in response to heat transfer from the swipe 170 can be amplified and applied to at least one of the cavities included in the transparent region configured to receive a liquid. The applied amplified voltage can cause a distribution of voltages across the multiple cavities included in the transparent region. More specifically, as described herein, at least some of the multiple cavities can be electrically coupled—via viases, traces, or other types of interconnectors formed from a transparent conductor (e.g., indium tin oxide (ITO)), for example—and thus, a voltage that is applied to a single cavity can cause a distribution of applied voltages across the other cavities in the transparent region. In an embodiment, the multiple cavities are arranged or otherwise assembled in a tree configuration or another type of hierarchical configuration in which the multiple cavities represent recursive subdivisions. The subdivisions can represent divisions of the space defined by the transparent region into eight octants, where a set of eight cavities represents a node in the tree, and each node in the tree has eight leafs (or children). Such a hierarchical configuration can be referred to as an octree. It can be appreciated that the octree has a top or root node and, in certain implementations, a voltage can be applied directly to the root node, which can cause another node in the octree to be subjected to another voltage consistent with the placement of the other node in the octree. Therefore, it can be appreciated that a voltage applied to the root node of the octree can cause a distribution of voltages across the octree. Similar distribution of voltages can be caused by application of a voltage to a specific cavity when the multiple cavities are arranged or otherwise assembled in a configuration other than an octree.

With respect to an electronics unit that can permit sensing and voltage amplification in accordance with aspects described herein, it should be appreciated that, in certain embodiments, the electronics unit also can include electronic components and/or other circuitry that can permit or otherwise facilitate specific functionality of the electronic device 110. For example, the electronics unit can include one or more processors, one or more input/output (I/O) interfaces, and/or one or more memory devices. In addition, the electronics unit also can include a bus architecture that can functionally couple various electronic components within the electronics unit. In one example, the bus architecture can include at least one of a system bus, a memory bus, an address bus, or a message bus, and can permit the exchange of information (data, metadata, and/or signaling) between the one or more processors, the one or more I/O interfaces, and/or the one or more memory devices, or respective functional elements therein. In certain scenarios, the bus in conjunction with one or more internal programming interfaces, which may be retained in memory, can permit such exchange of information. In certain embodiments, the electronics unit can be embodied in or can include a motherboard.

In at least certain embodiments, suitable amplification of the voltage generated in response to the swipe 170, and the application of such a voltage to at least one cavity of the multiple cavities in the transparent region contained in the opaque cover 160, can cause a distribution of voltages across the multiple cavities such that the voltage at a given cavity exceeds a threshold for melting the solid contained in the given cavity. As such, at a time t" subsequent to t', the solid-liquid transitions present in the multiple cavities can cause the liquid to flow towards the reservoirs described herein. As illustrated, flows 180a-180d can cause the reservoirs 130a-130b to receive the liquid that was in solid state forming the opaque cover 160 that occludes the view of the display of the device 110. Restoration of the liquid into the reservoirs is represented with arrows oriented towards the reservoirs.

Upon or after the liquid resulting from the melting of the opaque cover 160 has been received at the reservoirs described herein, the opaque cover 160 is effectively removed. As further illustrated in FIG. 1, at an instant t''', for example, the viewing through the surface 120 can be restored.

Figure 4:
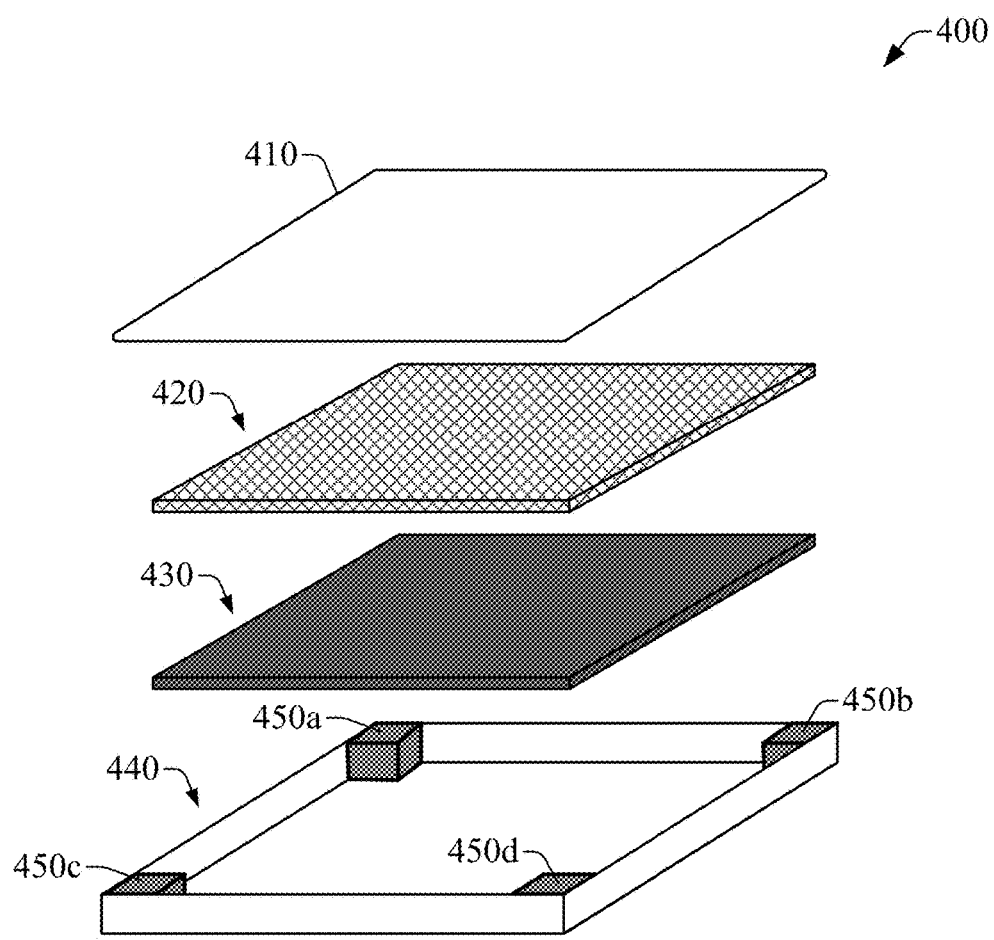
FIGS. 4-5 illustrate other examples of an electronic device that includes an embedded reversible cover in accordance with one or more embodiments of the disclosure.

FIG. 4 presents a schematic example of an electronic device 400 that can include a reversible embedded cover in accordance with one or more embodiments of the disclosure. The electronic device 400 can be embodied in a general purpose or special purpose computing device that may be autonomously powered, at least for a certain period, via the battery and/or a similar energy storage device. In one example, the electronic device 400 can be embodied in a portable personal computer or a handheld computing device, such as a mobile tablet computer, an e-reader, a mobile telephone (e.g., a smartphone), and the like. In another example, the electronic device 400 can be embodied in a wearable computing device, such as a watch, a pedometer, a biosensing wristband, goggles or head-mounted visors, or the like. In yet another example, the electronic device 400 can be embodied in portable consumer electronics equipment, such as a camera, a portable television set, a gaming console, a navigation device, a voice-over-internet-protocol telephone, a media playback device, or the like.

The electronic device 400 can include a screen 410 that can be transparent or translucent, and can permit viewing content displayed by the electronic device 400. In addition, in certain embodiments, the screen 410 can permit other forms of interaction with an end-user, such as touch (e.g., swipes, taps, or the like) or other types of contact. The screen 410 can generally be formed from a transparent or substantially transparent material (e.g., a plastic, a glass, or the like). In addition, as described herein (see FIG. 3, for example), the screen 410 can include a heat sensor layer and a solid transparent region defining multiple cavities (e.g., a hierarchical arrangement of 3D semi-open Voronoi regions). The solid transparent region can have a uniform or substantially uniform thickness in the range from about 200 μm to about 2 mm, and can be manufactured via 3D printing, lithography, or other deposition techniques. As described herein, in certain embodiments, the multiple cavities can receive a liquid, opaque substance that can solidify within the cavities. Therefore, in one example, the solid transparent region filled with the solidified substance can occlude the view of the content displayed at the electronic device 400. The filled solid transparent region also can provide mechanical protection against damage or wear and tear of at least a portion of the screen 410.

The electronic device 400 also can include an electronics unit 420 having various electronics components and/or circuitry that can permit or otherwise facilitate specific functionality of the device. For example, the electronics unit 420 can include one or more processors, one or more input/output (I/O) interfaces, and/or one or more memory devices. In addition, the electronics unit 420 also can include a bus architecture that can functionally couple various electronic components within the electronics unit 420. In one example, the bus architecture can include at least one of a system bus, a memory bus, an address bus, or a message bus, and can permit the exchange of information (data, metadata, and/or signaling) between the one or more processors, the one or more I/O interfaces, and/or the one or more memory devices, or respective functional elements therein. In certain scenarios, the bus in conjunction with one or more internal programming interfaces, which may be retained in memory, can permit such exchange of information. In scenarios in which multiple processors are included in the electronics unit 420, the electronic device 400 can utilize or otherwise leverage parallel computing. In certain embodiments, the electronics unit 420 can be embodied in or can include a motherboard. While the electronics unit 420 is illustrated as a single block, it should be appreciated that it can be comprised of multiple sub-units that are functionally coupled to each other. Functional coupling can include, for example, communicative coupling, electrical coupling, thermal coupling, mechanical coupling, couplings according to a combination of the foregoing, or the like.

In certain embodiments, the electronics unit 420 can include, optionally, a radio unit having one or more antennas and a communication processing unit that can permit wireless communication between the electronic device 400 and other devices, such as a remote computing device and/or a remote sensor. Further, in certain embodiments, the electronics unit 420 can include one or more sensors that can permit or otherwise facilitate certain functionality of the electronic device 400, such as navigation, biometric sensing, a combination thereof, or the like. For instance, the one or more sensors can include inertial sensor(s) (e.g., accelerometers, gyroscopes, etc.), magnetic sensor(s) (e.g., a three-axis magnetometer), biometric sensor(s), a combination thereof, or the like.

At least one of the one or more I/O interfaces that may be included in the electronics unit 420 can permit communication of information between the electronic device 400 and an external device, such as another computing device (e.g., a network element or an end-user device). Such communication can include direct communication or indirect communication, such as the exchange of information between the electronic device 400 and the external device via a network or elements thereof. In at least certain embodiments, such as the electronic device 504 in accordance with an embodiment of the disclosure, shown in FIG. 5, the one or more I/O interfaces can include one or more of network adapter(s), peripheral adapter(s), and/or rendering unit(s). Such adapter(s) can permit or otherwise facilitate connectivity between the external device and at least one of the one or more processors or the one or more memory devices that can be present in the electronics unit 420. Further, at least one of the one or more I/O interfaces included in the electronics unit 420 can permit, via a display unit, for example, output of information from the electronic device 400. At least a portion of such information can be generated at the electronic device 400 or a remote computing device functionally coupled to the electronic device 400. Such output can be any form of visual representation of the information, including textual, graphical, animation, audio, tactile, haptic, and the like. In addition or in the alternative, depending on the architectural complexity of the electronic device 400, at least one of the one or more I/O interfaces can include functional elements (e.g., lights, such as light-emitting diodes; a display, such as a liquid crystal display (LCD), a plasma monitor, a light-emitting diode (LED) monitor, or an electrochromic monitor; combinations thereof; or the like) that can permit control of the operation of the electronic device 400, or can permit conveying or revealing the operational conditions of the electronic device 400.

In one aspect, the bus architecture included in the electronics unit 420 can represent one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and the like.

The electronics unit 420 can include a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the electronic device 400, and can comprise, for example, both volatile and non-volatile media, and removable and/or non-removable media. In one aspect, the one or memory devices included in the electronics unit 420 can include computer-readable media in the form of volatile memory, such as random access memory (RAM), and/or non-volatile memory, such as read-only memory (ROM).

The one or more memory devices that can be contained within the electronics unit 420 can include computer-accessible instructions that, in response to execution (by at least one of the one or more processors included in the electronics unit 420, for example), can implement one or more of the functionalities (e.g., telecommunication, media display or playback, biometric sensing, navigation, a combination thereof, or the like) of the electronic device 400. The computer-accessible instructions can embody or can comprise one or more software components (not shown). In one scenario, execution of at least one of such component(s) can implement one or more of the functionalities of the electronic device 400. The one or more computer-accessible instructions can be persisted (e.g., stored, made available, or stored and made available) in a computer storage non-transitory medium contained in the memory and can be executed by at least one of the one or more processors contained within the electronics unit 420. The one or more computer-accessible instructions that embody a software component can be assembled into one or more program modules, for example, that can be compiled, linked, and/or executed at the electronic device 400. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the electronic device 400 or functionally coupled thereto.

In certain embodiments, the electronics unit 420 can include an input device configured to receive an input signal indicative or otherwise representative of a gesture or other types of interaction between an end-user and the electronic device 504. In addition to gestures, an interaction with the electronic device 504 from an end-user can include, for example, a tap, a swipe, actuation of a physical button, or the like. In one example, the input device can be included in the I/O interface(s) of the electronics unit 420, and can be embodied in or can be include a touch-screen display, a button, a camera or other optical sensors, a reader device, inductive coils, motion sensors, or the like. In addition or in other embodiments, the electronics unit 420 can include a heating device, circuitry for heat sensing and/or touch sensing, signal amplifiers (generally referred to as amplifiers) and various electrical conductors.

Further or in yet other embodiments, the heat sensor layer that can be included in the screen 410 can be coupled heat sensing circuitry that can be included in the electronics unit 420. In other embodiments, the heat sensor layer can include the heat sensing circuitry. Regardless of the specific arrangement, the heat sensor layer and the heat sensing circuitry can embody or can constitute a heat sensor configured to detect heat received from a source external to the electronic device 400. The heat sensor, via the heat sensing circuitry can be further configured to output a voltage or a current indicative of an amount of heat received at the heat sensor. A component of the electronics unit 420, such as a signal amplifier can be configured to amplify the voltage or the current output to melt at least a portion of the substance contained in the reservoirs 450a-450d. In addition, an electrical conductor coupled to the signal amplifier can be configured to apply an amplified voltage or amplified current from the signal amplifier to the multiple cavities that can be present in the transparent bounding region included in the screen 410 in order to melt the substance within the multiple cavities. Therefore, in one aspect, the melting of the substance can cause an amount of liquefied substance to flow to each of the reservoirs 450a-450d via the multiple cavities to restore or otherwise permit the view of a previously occluded screen 410. In other embodiments, a touch sensor can be included in the screen 410 and can be configured to detect a swipe at a screen 410. In response to the swipe, the touch sensor or sensing circuitry coupled thereto can output a voltage or current indicative or otherwise representative of the swipe. The signal amplifier can be configured to amplify such a voltage or current to melt the substance contained in the reservoirs 450a-450d.

The electronic device 400 can include a battery 430 or another type of power supply, which can power components or functional elements within the electronic device 400. The battery 430 can be rechargeable, and can be formed by stacking active elements (e.g., cathode, anode, separator material, and electrolyte) or winding a multi-layered roll of such elements.

In addition, the electronic device 400 also can include a housing 440 that can enclose or otherwise contain the battery 430 and the electronics unit 420. The housing 440 also can be configured (e.g., sized and/or otherwise suitably manufactured) to receive the screen 410 and form a closed device embedding the electronics unit 420 and the battery 430. In one aspect, the housing 440 can include four reservoirs 450a-450d placed at respective corners of the housing 440. Similar to other reservoirs described herein, each of the reservoirs 450a-450d can be configured to receive a liquid substance and/or contain an amount of the substance in solid state. The substance can be opaque and can be embodied or can include a eutectic alloy (such as a Pb—Mg alloy) having a melting point above room temperature in accordance with aspects of this disclosure. In certain embodiments, the heating device that can be included in the electronic device 504 can be coupled to each of the reservoirs 450a-450d, and can be configured to receive an electric signal to cause the heating device to melt the substance contained in the reservoirs. In one aspect, the electric signal can be generated by a component of the electronics unit 420 in response to input signal indicative or otherwise representative of a gesture or another type of interaction between the electronic device 504 and an end-user. As described herein, multiple cavities defined by the transparent bounding region included in the screen 410 can receive an amount of liquefied substance, which can solidify and can occlude the screen 410.

Figure 5:
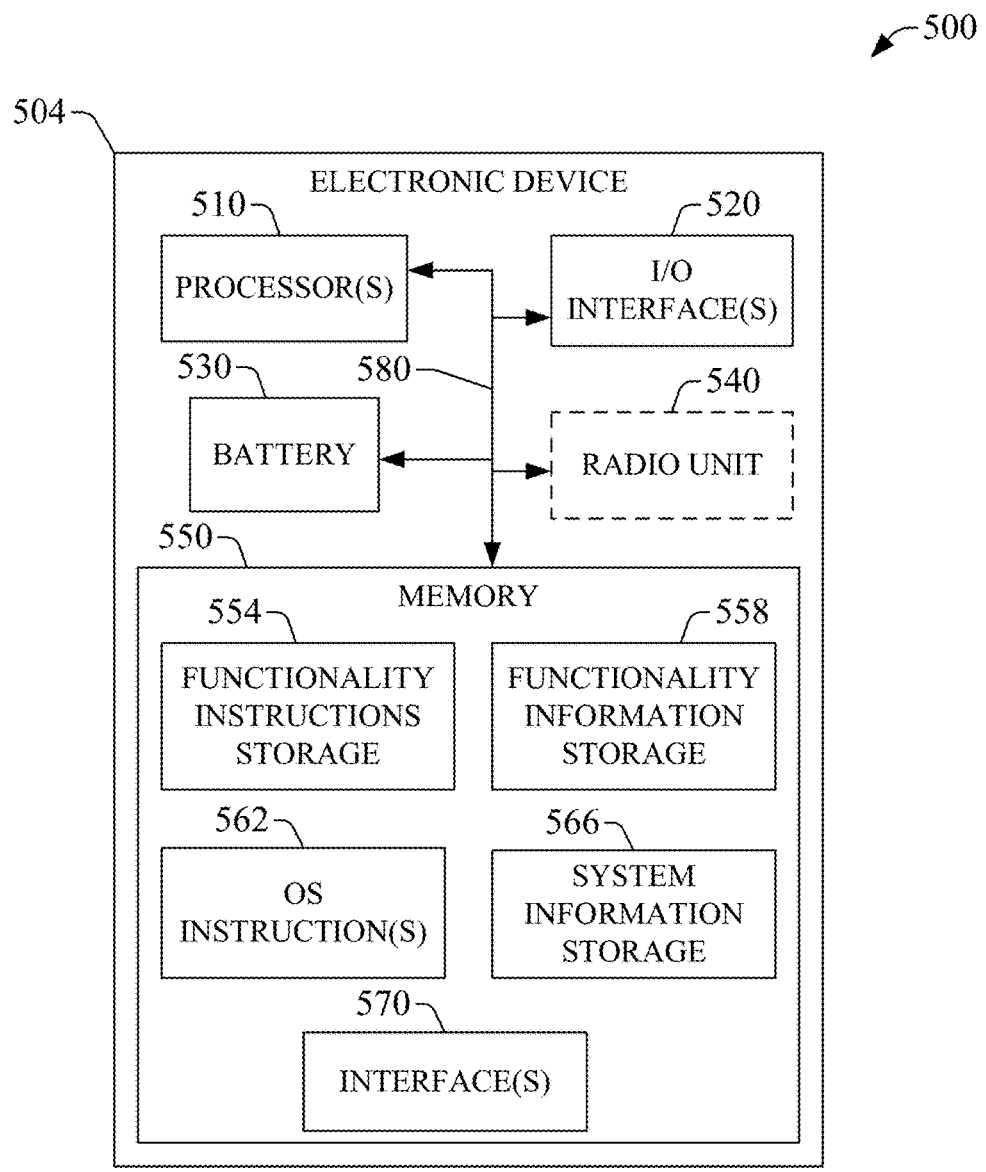

FIG. 5 illustrates another example of an electronic device 504 that can include a reversible embedded cover in accordance with one or more embodiments of the disclosure. The electronic device 504 can be embodied in a general purpose or a special purpose computing device that may be autonomously powered, at least for a certain period, via such a battery and/or a similar energy storage device. In one example, the electronic device 504 can be embodied in a portable personal computer or a handheld computing device, such as a mobile tablet computer, an e-reader, a mobile telephone (e.g., a smartphone), and the like. In another example, the electronic device 504 can be embodied in a wearable computing device, such as a watch, a pedometer, a biosensing wristband, goggles or head-mounted visors, or the like. In yet another example, the electronic device 504 can be embodied in portable consumer electronics equipment, such as a camera, a portable television set, a gaming console, a navigation device, a voice-over-internet-protocol telephone, a media playback device, or the like.

As illustrated, the electronic device 504 can include one or more processors 510, one or more I/O interfaces 520, a battery 530, one or more memory devices 550 (referred to as memory 550), and a bus architecture 580 (also referred to as bus 580) that can functionally couple various functional elements of the electronic device 504. In certain embodiments, the electronic device 504 can include, optionally, a radio unit 540. The radio unit 540 can include one or more antennas and a communication processing unit that can permit wireless communication between the electronic device 504 and another device, such as a remote computing device and/or a remote sensor. In addition, while not illustrated, in certain embodiments, the electronic device 504 can include one or more sensors that can permit certain functionality of the electronic device 504, such as navigation, biometric sensing, a combination thereof, or the like. For instance, the one or more sensors can include inertial sensor(s), magnetic sensor(s), biometric sensor(s), a combination thereof, or the like. The bus 580 can include at least one of a system bus, a memory bus, an address bus, or a message bus, and can permit the exchange of information (data, metadata, and/or signaling) between the processor(s) 510, the I/O interface(s) 520, and/or the memory 550, or respective functional elements therein. In certain scenarios, the bus 580 in conjunction with one or more internal programming interfaces 570 (also referred to as interface(s) 570) can permit such exchange of information. In scenarios in which the processor(s) 510 include multiple processors, the electronic device 504 can utilize or otherwise leverage parallel computing.

The I/O interface(s) 520 can permit functionally coupling (e.g., communicatively coupling) the electronic device 504 with an external device, such as another computing device (e.g., a network element or an end-user device). In one example, the I/O interface(s) 520 can permit or otherwise facilitate tethering the electronic device 504 to the external device. Such a functional coupling can permit communication between the electronic device 504 and the external device. The communication can include direct communication or indirect communication, such as the exchange of information between the electronic device 504 and the external device via a network or elements thereof. In at least certain embodiments, the I/O interface(s) 520 can include network adapter(s), peripheral adapter(s), and/or rendering unit(s). Such adapter(s) can permit or otherwise facilitate connectivity between the external device and at least one of the processor(s) 510, the memory 550, and/or the radio unit 540 (when present). For example, the peripheral adapter(s) can include one or more ports, which can include at least one of parallel ports, serial ports, Ethernet ports, V.35 ports, or X.21 ports. In certain embodiments, the parallel ports can include General Purpose Interface Bus (GPIB) ports and/or IEEE-1284 ports, and the serial ports can include Recommended Standard (RS-232) ports, V.11 ports, USB ports, FireWire, and/or IEEE-1394 ports.

In one aspect, at least one of the I/O interface(s) 520 can functionally couple, via a network adapter, for example, the electronic device 504 to one or more remote computing devices or sensors (not depicted in FIG. 5). To at least such an end, the at least one of the I/O interface(s) 520 can utilize or otherwise leverage one or more traffic and signaling pipes that can permit or otherwise facilitate the exchange of traffic and/or signaling between the electronic device 504 and the one or more remote computing devices or sensors. Such network coupling provided at least in part by the at least one of the I/O interface(s) 520 can be implemented in a wired environment, a wireless environment, or both. The information that is communicated by the at least one of the I/O interface(s) 520 can result from the implementation of certain functionality (telecommunication, media display or playback, navigation, biometric sensing, and the like) of the electronic device 504.

Further, at least one of the I/O interface(s) 520 can permit, via a rendering unit, for example, output of information from the electronic device 504. The rendering unit can be embodied in or can include a display device, an audio speaker, a haptic device, a combination thereof, or the like. At least a portion of such information can be generated at the electronic device 504 or a remote computing device functionally coupled to the electronic device 504. Such output can be any form of visual representation of the information, including textual, graphical, animation, audio, haptic, and the like. In addition or in the alternative, depending on the architectural complexity of the electronic device 504, the at least one of the I/O interface(s) 520 can include functional elements (e.g., lights, such as light-emitting diodes; a display device, such as an LCD, a plasma monitor, an LED monitor, or an electrochromic monitor; combinations thereof; or the like) that can permit control of the operation of the electronic device 504, or can permit conveying or revealing the operational conditions of the electronic device 504.

In one aspect, the bus 580 can represent one or more of several possible types of bus structures, including a memory bus or a memory controller, a peripheral bus, an accelerated graphics port, and a processor or local bus using any of a variety of bus architectures. As an illustration, such architectures can comprise an ISA bus, a MCA bus, an EISA bus, a VESA local bus, an AGP bus, a PCI bus, a PCI-Express bus, a PCMCIA bus, a USB, and the like.

The electronic device 504 can include a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the electronic device 504, and can comprise, for example, both volatile and non-volatile media, and removable and/or non-removable media. In one aspect, the memory 550 can include computer-readable media in the form of volatile memory, such as RAM, and/or non-volatile memory, such as ROM.

The memory 550 can include functionality instructions storage 554 and functionality information storage 558. In certain embodiments, one or more of the functionality instructions storage 554 and the functionality information storage 558 can be embodied in or can comprise removable/non-removable, and/or volatile/non-volatile computer storage media. The functionality instructions storage 554 can include computer-accessible instructions including computer-readable and/or computer-executable instructions. In response to execution (by at least one of the processor(s) 510, for example), the computer-accessible instructions can implement one or more of the functionalities of the electronic device 504. Such functionalities can include, for example, telecommunication, media display or playback, biometric sensing, navigation, a combination thereof, or the like. The computer-accessible instructions can embody or can comprise one or more software components (not depicted). As such, in one scenario, execution of at least one of such component(s) can implement one or more of the functionalities of the electronic device 504. A processor of the processor(s) 510 that executes at least one of the software component(s) can retrieve information from and/or retain information in one or more memory elements in the functionality information storage 558 in accordance with the functionality programmed or otherwise configured by the software component(s). The one or more memory elements within the functionality information storage 558 can include at least one of code instructions, information structures, or the like.

At least the portion of the computer-accessible instructions included in the memory 550 can be stored in a non-transitory computer storage medium contained in the memory 550 and can be executed by at least one of the processor(s) 510. In one example, the functionality instruction(s) storage 554 can embody a non-transitory computer-readable storage medium having computer-accessible instructions that, in response to execution, cause at least one processor (e.g., one or more of the processor(s) 510) to perform a group of operations associated with specific functionality of the electronic device 504. In addition, the one or more computer-accessible instructions that embody a software component can be assembled into one or more program modules, for example, that can be compiled, linked, and/or executed at the electronic device 504 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the electronic device 504 or functionally coupled thereto.

At least one of the one or more interfaces 570 (e.g., application programming interface(s)) can permit or facilitate communication of information between two or more components within the functionality instructions storage 554. The information that is communicated by the at least one interface can result from implementation (e.g., execution) of one or more operations associated with a functionality of the electronic device 504. For example, two or more software components in the functionality instructions storage 554 that are being executed can exchange information via the at least one of the interface(s) 570.

It should be recognized that while the functionality instructions storage 554 and other executable program components, such as the OS instruction(s) 562, are illustrated herein as discrete blocks, such software components can reside at various times in different memory components of the electronic device 504, and can be executed by at least one of the processor(s) 510.

In addition, the memory 550 can comprise computer-accessible instructions and information (e.g., data, metadata, and/or programming code instructions) that permit or otherwise facilitate the operation and/or administration (e.g., upgrades, software installation, any other configuration, or the like) of the electronic device 504. Accordingly, as illustrated, the memory 550 can comprise a memory element 562 (labeled operating system (OS) instruction(s) 562) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the electronic device 504 can dictate a suitable OS. The memory 550 also can include a system information storage 566 having data, metadata, and/or instructions (e.g., programming code) that can permit or otherwise facilitate the operation and/or administration of the electronic device 504. Elements of the OS instruction(s) 562 and the system information storage 566 can be accessible or can be operated on by at least one of the processor(s) 510.

As described herein, the electronic device 504 can include a battery 530 that can power components or functional elements within the electronic device 504. The battery 530 can be rechargeable, and can be formed by stacking active elements (e.g., cathode, anode, separator material, and electrolyte) or winding a multi-layered roll of such elements.

In addition to the battery 530, the electronic device 504 can include one or more transformers (not depicted) and/or other circuitry (not depicted) to achieve a power level suitable for the operation of the electronic device 504 and the components, functional elements, and related circuitry therein. In certain scenarios, the electronic device 504 can be attached to a conventional power grid to recharge the battery 530 and ensure that the electronic device 504 and the functional elements therein can be operational. In one aspect, at least one of the I/O interface(s) 520 can permit connecting to the conventional power grid. In certain embodiments, the electronic device 504 can include an energy conversion component, such as a solar panel, to provide additional or alternative power resources or power autonomy to the electronic device 504.

It should be appreciated that, in certain embodiments, the electronic device 504 can operate in a networked environment by utilizing connections to one or more remote computing devices and/or sensors (not depicted in FIG. 5). As an illustration, a remote computing device can be a personal computer, a portable computer, a server, a router, a network computer, a peer device or other common network node, and so on. As described herein, connections (physical and/or logical) between the electronic device 504 and a remote computing device or sensor can be made via one or more traffic and signaling pipes, which can comprise wired link(s) and/or wireless link(s) and several network elements (such as routers or switches, servers, and the like) that form a local area network (LAN), a wide area network (WAN), and/or other networks (wireless or wired) having different footprints. Such networking environments are conventional and commonplace in dwellings, offices, enterprise-wide computer networks, intranets, local area networks, and wide area networks.

In one or more embodiments, at least some of the functionality of the electronic device 504 can be practiced in distributed computing environments, such as grid-based environments, where tasks can be performed by remote processing devices (e.g., network servers) that are functionally coupled (e.g., communicatively linked or otherwise coupled) through a network having traffic and signaling pipes and related network elements. In a distributed computing environment, in one aspect, one or more software components (such as program modules) that permit or otherwise facilitate the functionality of the electronic device 504 may be located in both the electronic device 504 and at least one remote computing device.

Figure 6:
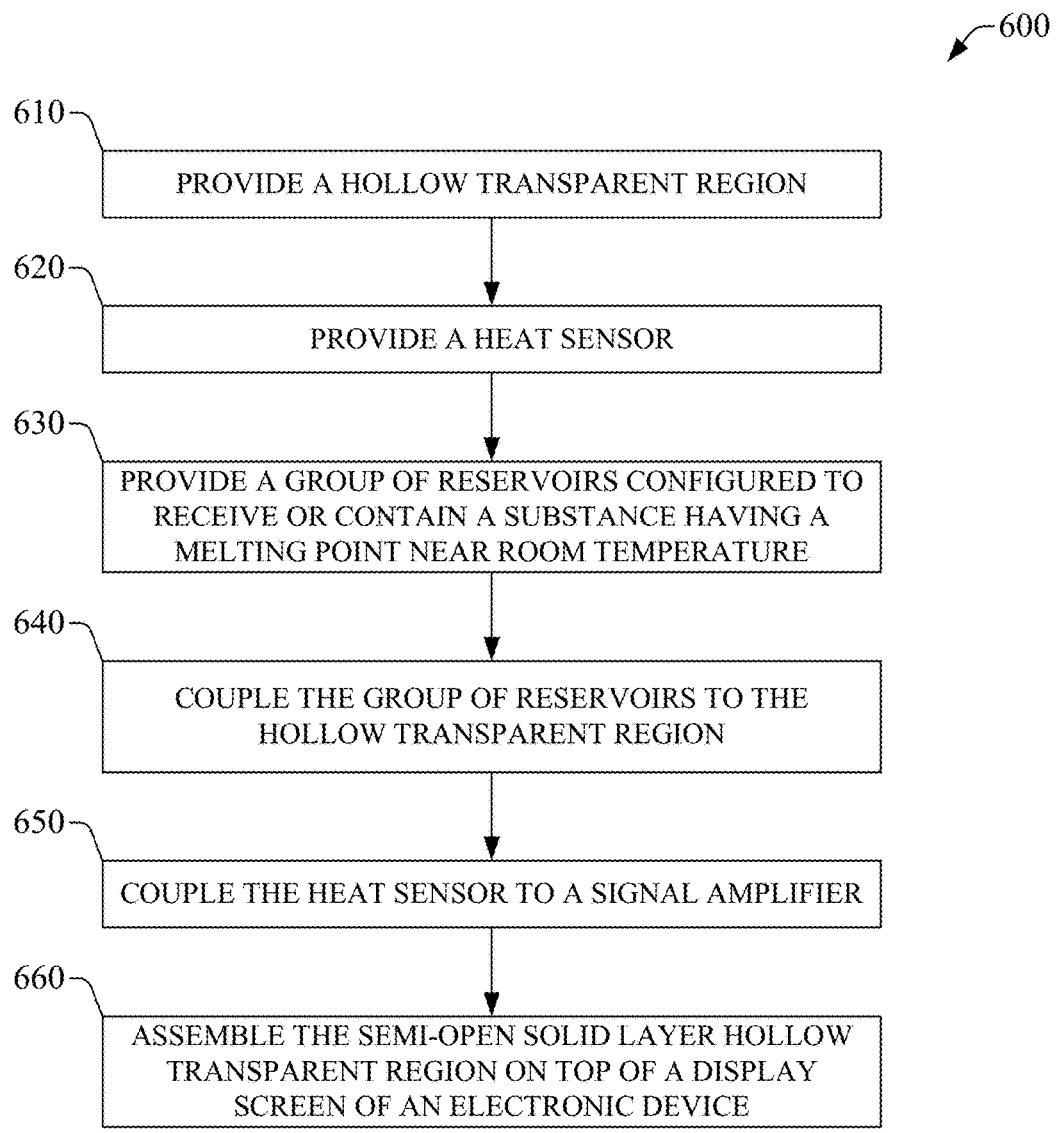
FIGS. 6-8 illustrate examples of methods in accordance with one or more embodiments of the disclosure.

Numerous techniques may be implemented in accordance with aspects of this disclosure. In view of the aspects described herein, an example method for providing an embedded reversible cover for an electronic device according to one or more embodiments of the disclosure is illustrated in FIG. 6. The example method 600 includes block 610, at which a semi-open or otherwise hollow transparent region can be provided. In certain embodiments, providing the hollow transparent region can include providing a solid (flexible or otherwise) bounding surface that embodies or includes the transparent region. As described herein, the transparent region can have a uniform or nearly uniform thickness. In addition, or in other embodiments, the solid bounding surface can define multiple cavities in its interior. In one example, the multiple cavities can be arranged or otherwise assembled (e.g., manufactured) to form a hierarchical tesselation of 3D Voronoi regions, e.g., a quadtree, an octree, or other tree structures. As such, in certain embodiments, providing the semi-open solid layer can include determining or otherwise computing a specific arrangement of 3D Voronoi regions. Further or in other embodiments, providing the semi-open solid layer can include manufacturing the arrangement of 3D Voronoi regions via 3D printing and/or lithography.

At block 620, a heat sensor can be provided. As described herein, in certain embodiments, providing the heat sensor can include depositing or otherwise assembling a solid layer of a material that can absorb IR radiation onto the semi-open solid layer. At block 630, a group of reservoirs (e.g., reservoirs 130a-130d) can be provided. In one aspect, each of the group of reservoirs can be configured to receive or contain a substance (such as a eutectic alloy) having a melting point in a range near room temperature. At block 640, the group of reservoirs can be coupled to the hollow transparent region provided at block 610. For example, the coupling between a reservoir of the group of reservoirs can be fluidically coupled to the hollow transparent region, which can permit the transfer of liquid between the reservoir and the interior of the hollow transparent region for example. At block 650, the heat sensor provided at block 620 can be coupled (e.g., electrically and/or thermally coupled) to a signal amplifier (analogic or digital). In one example, the signal amplifier can amplify an electric signal (e.g., a voltage or a current) generated or otherwise output by the heat sensor. At block 660, the semi-open solid layer can be assembled or otherwise arranged onto a display screen of the electronic device.

It should be appreciated that in the subject example method 600, the various components that can be provided can be monolithically deposited or otherwise manufactured via numerous techniques, individually or in combination, such as molecular beam epitaxy, chemical vapor deposition, sputtering, lamination, and the like.

Figure 7:
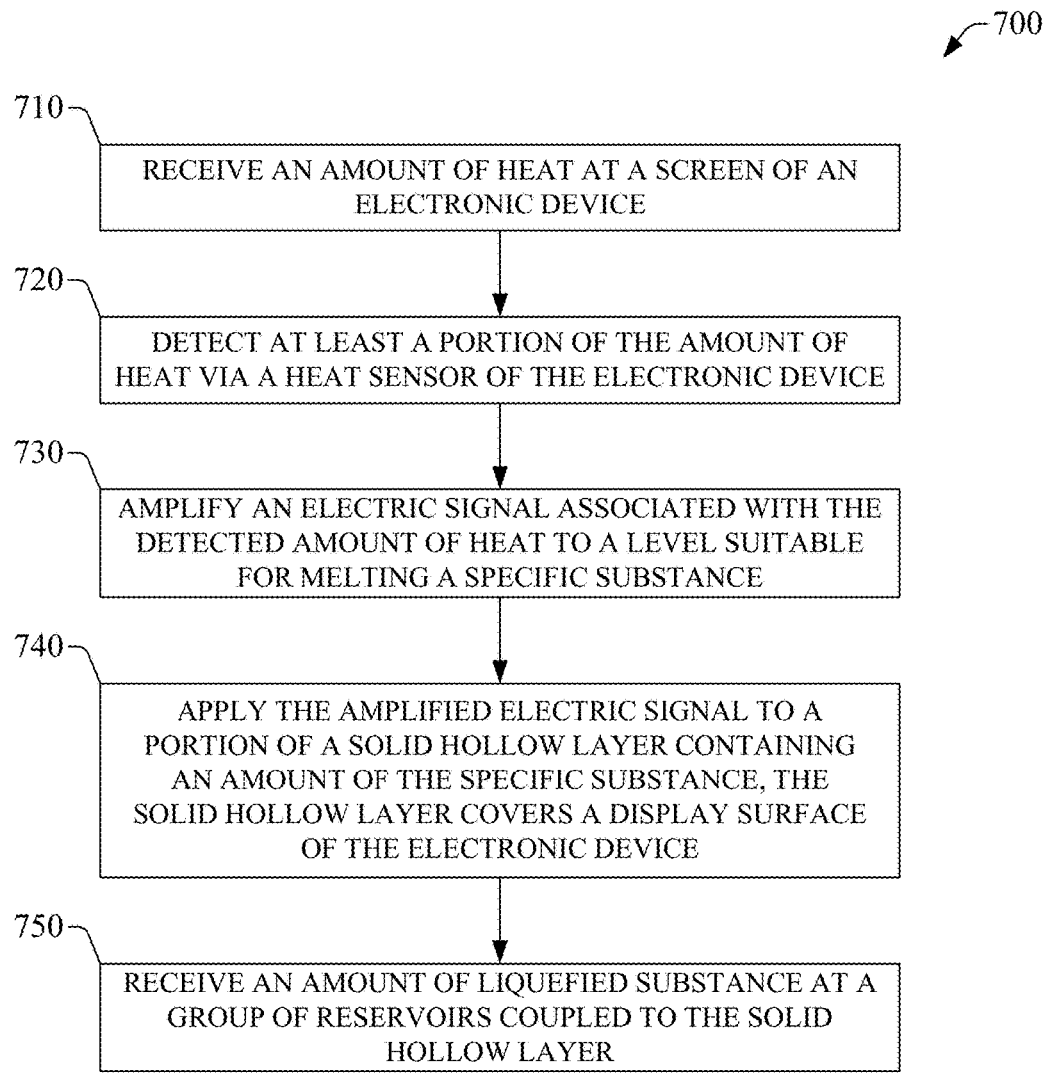

FIG. 7 presents a flowchart of an example method 700 for reversibly uncovering a display screen of an electronic device in accordance with one or more embodiments of the disclosure. At block 710, an amount of heat can be received at the screen. As described herein, in certain scenarios, the heat can be received via a swipe or other types of interactions between an end-user and the electronic device. At block 720, at least a portion of the amount of heat can be detected via a heat sensor of the electronic device. At block 730, an electric signal (e.g., a voltage or a current) associated with the detected amount of heat can be amplified to a level suitable for melting a specific substance. In one example, as described herein, the specific substance can be opaque and can be embodied in a eutectic alloy (e.g., a Pb—Mg alloy) having a melting point above, yet proximate to room temperature. The heat sensor can generate or otherwise output the electric signal at block 720, where the electric signal can be representative or otherwise indicative of the detected heat. At block 740, the amplified electric signal (e.g., an amplified voltage) can be applied to a portion of a solid hollow layer (the bounding surface 320, for example) containing an amount of the specific substance in a solid phase. As described herein, in certain embodiments, the solid hollow layer can define several semi-open 3D Voronoi regions in its interior, where such regions can be arranged hierarchically (e.g., in an octree). As such, in one embodiment, applying the amplified electrical signal to the portion of the solid hollow layer can include applying such a signal to a root node in a hierarchical arrangement of the semi-open 3D Voronoi regions. In response to the application of the amplified electric signal, the substance contained in the solid hollow layer can transition from the solid phase to the liquid phase. Therefore, in one embodiment, at block 750, a reservoir of a group of reservoirs (e.g., reservoirs 130a-130d) coupled to the solid hollow layer can receive an amount of the liquefied substance. As such, viewing through the screen of the electronic device can be restored, and effectively, a solid cover of the screen can be removed. As described herein, such removal can be reversible in that the substance contained in the group of reservoirs can be injected into the solid hollow layer in order to occlude the viewing through the screen of the electronic device.

Figure 8:
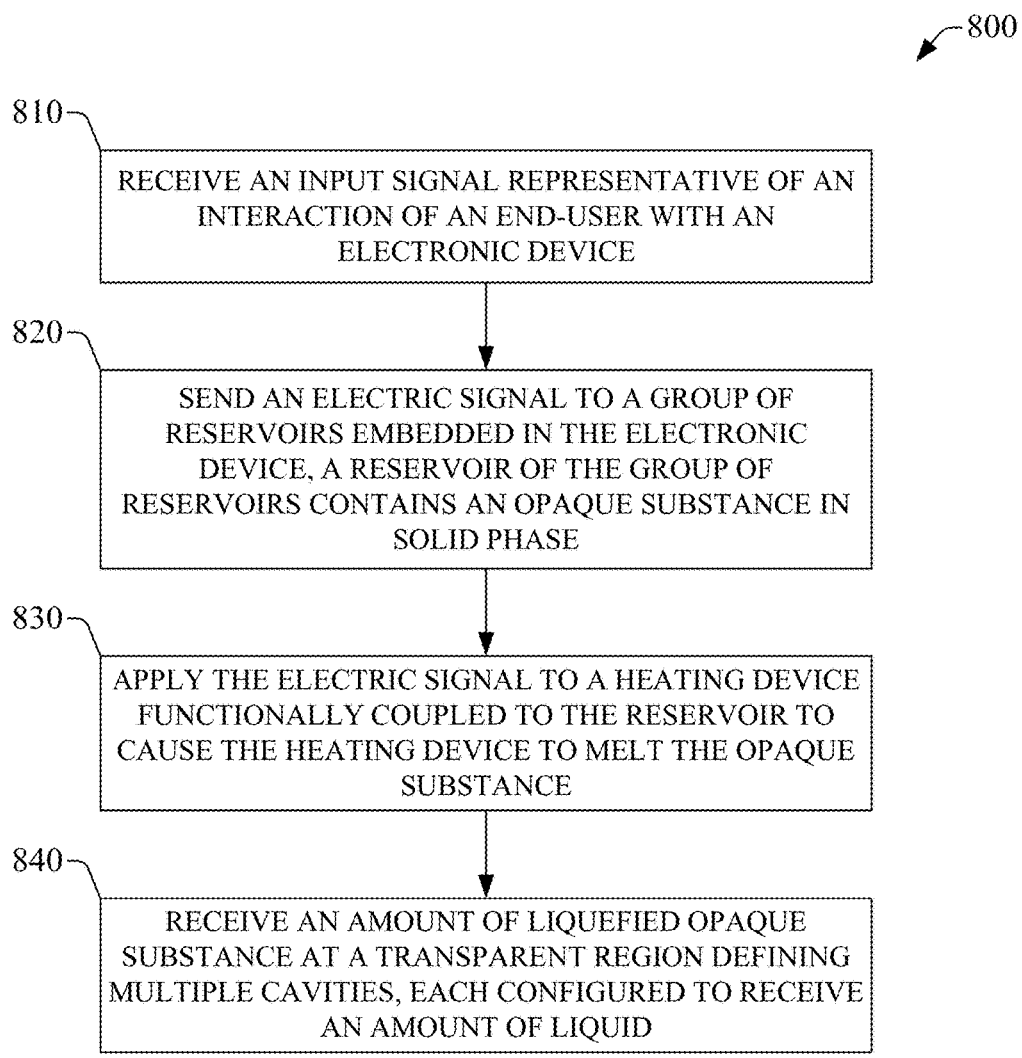

FIG. 8 presents a flowchart of an example method 800 for reversibly covering a display screen of an electronic device in accordance with one or more embodiments of the disclosure. Initially, as described herein, the display screen can permit viewing content displayed or otherwise presented at the electronic device. At block 810, an input signal representative of an interaction of an end-user with the electronic device can be received. As described herein, the interaction can be embodied in or can include a gesture (e.g., gesture 140), or a swipe or tap at the display screen of the electronic device. In response to the gesture, at block 820, an electric signal can be sent or otherwise transmitted to a group of reservoirs embedded in the electronic device. A reservoir of the group of reservoirs can contain an opaque substance in solid phase. In certain embodiments, the group of reservoirs can include four reservoirs (e.g., reservoirs 130a-130d), each at a corner of a housing (e.g., housing 210 or housing 440) of the electronic device. In one embodiment, the opaque substance can be embodied in or can comprise a eutectic alloy and the electric signal (such as a voltage or voltage drop) can be suitable to cause the substance to melt. For instance, the electric signal can be a voltage having a magnitude of the order of microvolt or a current having a magnitude of the order of microampere. Melting of the substance can cause the formed liquid to egress from the reservoir and to ingress into a transparent region (e.g., region 320) fluidically coupled to the reservoir. As such, at block 830, the electric signal or a portion thereof can be applied to a heating device coupled to the reservoir containing the opaque substance in order to cause the heating device to melt the substance. It should be appreciated that, in certain embodiments, blocks 820 and 830 can be consolidated into a single block in which the electric signal is sent or otherwise transmitted directly to the heating device that is coupled to the reservoir containing the opaque substance. At block 840, an amount of liquefied substance can be received at the transparent region. As described herein, the transparent region can be bounded by six surfaces and can define multiple cavities, each configured to receive an amount of liquid. The liquid that enters the multiple cavities can solidify because there is no electric signal applied to the multiple cavities. Therefore, in one aspect, the transparent region and the solidified substance therein can form an opaque cover that occludes the view of the display screen.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps, or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings; or the like. In addition, it is to be understood and appreciated that not all illustrated actions may be required to implement a protocol, a procedure, a process, or a method in accordance with one or more aspects of this disclosure.

As utilized in this application, the terms "component," "system," "architecture," "I/O interface" (or terms referring to other computing device interfaces), "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, and the electronic components can include a processor therein to execute software or firmware that provides, at least in part, the functionality of the electronic components. In certain embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components can communicate or otherwise be coupled via thermal, mechanical, electrical, and/or electromechanical coupling mechanisms (such as conduits, connectors, combinations thereof, or the like). A computing device interface can include input/output (I/O) components as well as associated processor, application, and/or other programming components. The terms "component," "system," "architecture," "I/O interface" (or terms referring to other computing device interfaces), "unit," "module," and "pipe" can be utilized interchangeably and can be referred to collectively as functional elements.

As utilized in this disclosure, the term "processor" can refer to any computing processing unit or device comprising single-core processors; single processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "memory" and substantially any other information storage component relevant to the operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Examples of various types of non-transitory storage media can include hard-disc drives, zip drives, CD-ROM, digital versatile disks (DVDs) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include ROM, programmable ROM (PROM), electrically programmable ROM (EPROM), electrically erasable programmable ROM (EEPROM), or flash memory. Volatile memory can include RAM, which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of embodiments of embedded reversible covers for an electronic device in accordance with one or more aspects of this disclosure. It is, of course, not possible to describe every conceivable combination of elements and/or methodologies for purposes of describing the various features of the disclosure, but one of ordinary skill in the art can recognize that many further combinations and permutations of the claimed subject matter are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A device, comprising:
   one or more memory devices;

one or more processors coupled to the one or more memory devices;

a display screen to view content displayed by the device, the display screen having an upper surface and a lower surface opposite to the upper surface;

a transparent bounding region bounded by six surfaces having a first surface and a second surface opposite to the first surface, the first surface being in contact with the upper surface of the display screen, wherein the transparent bounding region is transparent and defines multiple cavities, each of the multiple cavities configured to receive an opaque lead-magnesium alloy that occludes the view of the display screen, and wherein a first cavity of the multiple cavities permits passage of liquefied lead-magnesium alloy to a second cavity of the multiple cavities;

a reservoir at each corner of a housing of the device, each reservoir is configured to receive an amount of the lead-magnesium alloy in liquid phase and defines a passage that permits egress of liquid to the transparent bounding region;

an input device configured to receive an input signal indicative of an interaction of an end-user with the device; and a heating device coupled to each reservoir and configured to receive an electric signal to cause the heating device to melt the lead-magnesium alloy in each reservoir in response to the input signal, whereby a third cavity of the multiple cavities receives an amount of liquefied lead-magnesium alloy that solidifies and occludes the display screen.

2. The device of claim 1, further comprising:

a heat sensor layer in contact with the second surface of the transparent bounding region and configured to detect heat received from a source external to the device, the heat sensor further configured to output a voltage indicative of an amount of heat received at the heat sensor;

a signal amplifier configured to amplify the voltage to melt the lead-magnesium alloy; and an electrical conductor coupled to the signal amplifier and configured to apply an amplified voltage from the signal amplifier to the multiple cavities to melt the lead-magnesium alloy within the multiple cavities and cause an amount of liquefied lead-magnesium alloy to flow to each reservoir via the multiple cavities to permit the view of the display screen.

3. The device of claim 1, wherein each of the multiple cavities represents a three-dimensional Voronoi region, and wherein the multiple cavities are arranged in hierarchical tree structure having a root node and leaf nodes, wherein the root node has eight leaf nodes and a first node of the eight leaf nodes has eight second leaf nodes.

4. A device, comprising:

a display screen having an upper surface and a lower surface opposite to the upper surface; a transparent bounding region bounded by six surfaces, a surface of the transparent bounding region being in contact with the upper surface of the display screen, wherein the transparent bounding region defines multiple cavities, each of the multiple cavities configured to receive a substance having a melting point above room temperature, and wherein a first cavity of the multiple cavities is electrically coupled to a second cavity of the multiple cavities, and further wherein the first cavity is fluidically coupled to the second cavity; and a group of reservoirs fluidically coupled to the transparent bounding region, a reservoir of the group of reservoirs being configured to receive an amount of the substance in liquid phase and to receive a second amount of the substance in solid phase.

5. The device of claim 4, further comprising:

an input device configured to receive an input signal indicative of an interaction of an end-user with the device; and a heating device coupled to the reservoir and configured to receive an electric signal to cause the heating device to melt the second amount of the substance in solid phase in response to the input signal.

6. The device of claim 4, wherein the transparent bounding region has a thickness in the range from about 200 μm to about 2 mm.

7. The device of claim 4, wherein each of the multiple cavities represents a three-dimensional Voronoi region, and wherein the multiple cavities are arranged in a hierarchical tree structure having a root node and multiple leaf nodes.

8. The device of claim 7, wherein the root node has eight leaf nodes and a first node of the eight leaf nodes has eight second leaf nodes.

9. The device of claim 4, wherein the substance comprises a eutectic alloy having a melting point about 20 degrees Kelvin greater than room temperature.

10. The device of claim 9, wherein the eutectic alloy is a lead-magnesium alloy.

11. The device of claim 4, further comprising:

a touch sensor configured to detect an input at a screen of the device and to output an electric signal in response to the input, wherein the screen includes the transparent bounding region; and an amplifier configured to receive the electric signal and output a voltage or a current to melt the substance.

12. The device of claim 4, further comprising:

a heat sensor configured to detect heat received at a screen of the device and to output an electric signal indicative of an amount of heat received at the heat sensor, wherein the screen includes the transparent bounding region; and an amplifier configured to receive the electric signal and output a voltage or a current to melt the substance.

13. The device of claim 12, wherein the voltage has a magnitude in the order of microvolts, and wherein the current has a magnitude in the order of microamperes.

14. The device of claim 12, further comprising a conducting interconnect coupled to the amplifier and configured to apply an amplified voltage to a cavity of the multiple cavities to melt the substance in the cavity.

15. The device of claim 4, wherein a conducting interconnect is from a transparent conductor that couples the first cavity to the second cavity.

16. A method, comprising:

receiving an input signal representative of an interaction of an end-user with an electronic device;

sending an electric signal to a group of reservoirs embedded in the electronic device and fluidically coupled to a transparent region bounded by six surfaces, wherein a reservoir of the group of reservoirs contains an opaque substance in solid phase, and wherein the transparent region defines a semi-open space and covers a display surface of the electronic device;

applying the electric signal to a heating device coupled to the reservoir to cause the heating device to melt the opaque substance; and receiving an amount of liquefied opaque substance at the transparent region, wherein the amount of liquefied opaque substance solidifies and occludes a portion of the display surface.

17. The method of claim 16, further comprising:

receiving an amount of heat at a screen of the electronic device;

detecting at least a portion of the amount of heat via a heat sensor of the electronic device; amplifying a second electric signal associated with the detected amount of heat to a level suitable for melting the opaque substance; and applying the amplified second electric signal to the transparent region containing an amount of solidified opaque substance.

18. The method of claim 16, further comprising receiving a second amount of liquefied opaque substance at a second reservoir of the group of reservoirs, wherein the opaque substance includes a eutectic alloy.

19. The method of claim 16, wherein the transparent region defines multiple cavities within the semi-open space; and wherein amplifying the second electrical signal comprises increasing a magnitude of the electric signal to cause a heating element associated with a cavity to melt a portion of the opaque substance in the cavity.

20. The method of claim 16, wherein the transparent region defines multiple three-dimensional (3D) Voronoi regions arranged in a hierarchical tree structure having a root node and multiple leaf nodes; and wherein applying the amplified second electric signal comprises applying the amplified second electric signal to a specific 3D Voronoi region of the multiple 3D Voronoi regions to propagate the applied amplified second electric signal to a second 3D Voronoi region of the multiple 3D Voronoi regions.

* * * * *